April 18, 1967

W. JOHNS ET AL 3,315,202

LOAD SENSING DEVICE

Filed June 2, 1964

United States Patent Office 3,315,202
Patented Apr. 18, 1967

3,315,202
LOAD SENSING DEVICE
Wilford Johns and Charles F. Grabenstein, Cumberland, Md., assignors, by mense assignments, to Toroid Corporation, Huntsville, Ala., a corporation of Alabama
Filed June 2, 1964, Ser. No. 371,911
1 Claim. (Cl. 338—5)

Load sensing elements are known in which the load in tension or compression is measured by measuring the deformation of a strained member by strain gauges. Circular force rings are known wherein the load is applied to opposite sides of a metal ring and the strain is measured as an indication of the load.

Ruge Patent No. 2,561,318 defines a square ring and a round hole type of force ring wherein the ring shape has four areas of high stress spaced from four areas of low stress. Strain gauges are located on the ring in locations on the load axis and normal to the load axis but the signals from strain gauges so positioned are not equal. The two strain gauges located on the ring on the load axis are not stressed equally with those placed on the ring perpendicular to the load axis, and therefore the signals will be quite different from the gauges 90° apart because of the modification of the cross section of the ring at the load axis by the load applying portions.

It is an object of this invention to provide a load sensitive element with increased sensitivity for such a load measuring device and good linearity of output signal.

It is another object of this invention to provide a load sensing element having strain gauges that are substantially equally stressed for greater sensitivity in measuring the load on the load element.

It is another object of this invention to provide a load element including flexures between the load axis and the portion of the element in which the strain is measured.

It is a further object of this invention to prevent overstressing of the strain member by the provision of axial overload stops.

An understanding of the invention will be had by reference to the following detailed description when considered in conjunction with the accompanying drawings wherein.

Figure 1:
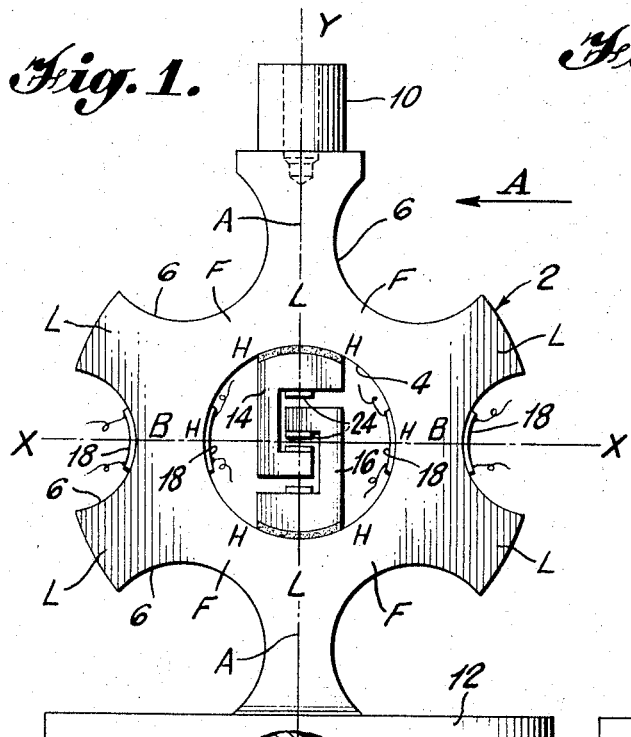
FIG. 1 is an elevational view of one embodiment of the invention.
Figure 2:
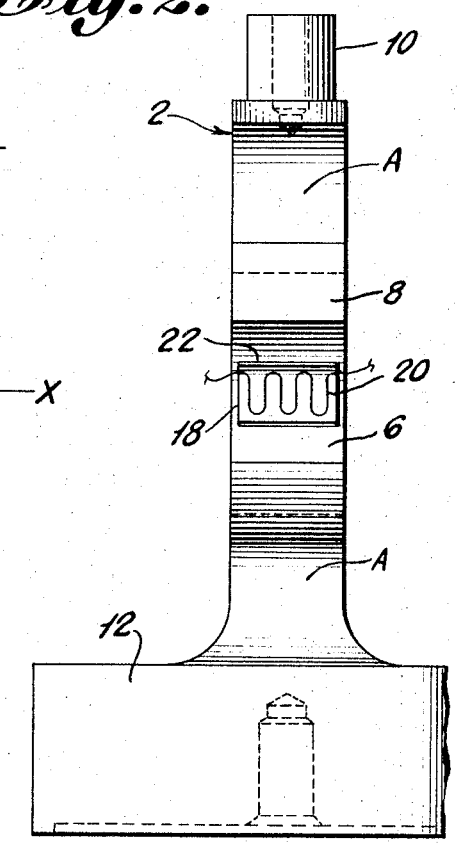
FIG. 2 is a side elevation of FIG. 1 along the direction of arrow A.

In FIG. 1 is shown a strain member in the form of an annulus cut from plate 2. The central opening 4 is formed in plate 2 and the edge of the plate is reduced in radial depth by cut out portions as shown at 6, located 60° apart around the periphery. The portions between the two cut out portions 6, located at the top and bottom, extend as at A to form the load applying elements between member 10 and plate 2, and base 12 and plate 2. The load applying members 10 and 12 may apply load in tension or compression.

The cut out portion 6 defines, with hole 4, zones of high stress concentration at H the maximum being, of course, where the metal is thinnest in a radial direction. When load is applied at A along the axis $y$—$y$, the greatest deformation will occur at the zones B on axis $x$—$x$. If the ring formed by plate 2 were not cut out as shown at portion 6, such an annular strain member would act like a pair of arches with the bases of the arches along the axis $x$—$x$. The inherent stiffness of an arch as a structure member precludes its use as a strain member where controlled deformation is a prime requirement.

As stated above, the zones H of high stress concentration are where the sections of the ring between hole 4 and cut out portion 6 are thinnest, and between such sections where the metal is the thickest as shown at L, the lowest stress concentration takes place.

It will be seen from FIG. 1 that the load is applied along the load axis $y$—$y$ to an area of the lowest stress concentration. On either side of the load axis, the cross section of the ring decreases and at 30° on either side of the load axis, the cross section is a minimum. These areas H will deflect and will act as flexures or hinges F so that the ring will be stressed by the load at the next thin cross section B. The section of the ring from A–F may be regarded as a lever and from F–B may be regarded as another lever. The flexure located at F in effect, provides a "hinge point" so that the stress is transmitted from the load axis $y$—$y$ to section B through the flexures at F so that section B is placed in tension on the outside and compression on the inside by the application of a compression load. The stress is multiplied by the moment arm extending from the $y$—$y$ axis to the center of section B. The tension and compression loads measured by strain gauges located at these points on the inside and outside of plate 2 have been found to be substantially equal. Maximum sensitivity is obtained from strain gauges connected in a bridge measuring circuit when the tension and compression signals are substantially equal.

Figure 3:
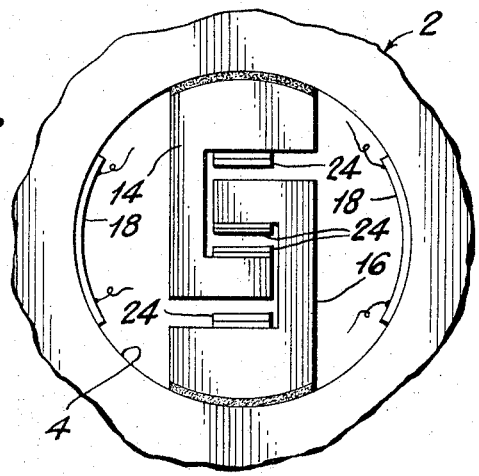
FIG. 3 is a view of the overload limit stops and adjusting shims.

In order to limit the deflection of the load sensitive member to the safe value under compression and tension loads, there is provided an overload limit stop substantially on the center line or load axis. In the embodiment illustrated in FIG. 1, the stop takes the form of C-shaped members 14 and 16 secured to the inner side of the ring in hole 4 as by welding the one leg of the C-shaped member to the load sensitive element, and having the free legs of the C-shaped member interfitted as shown. The clearance between the legs is dictated by the allowable deformation of the structure within the design load of the element and it may be adjusted by the use of shims 24 attached to the legs of the C-shaped members as shown in FIG. 3.

Strain gauges 18 are secured to strain members at sections B along the axis $x$—$x$ where the deformation is greatest for reasons described above.

Figure 5:
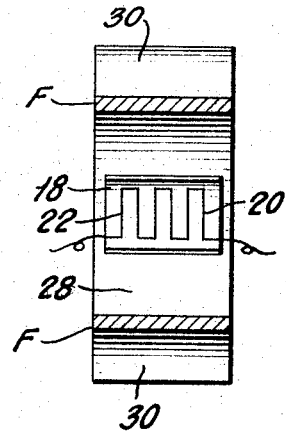
FIG. 5 is a view along the line 5—5 of FIG. 4.
Figure 6:
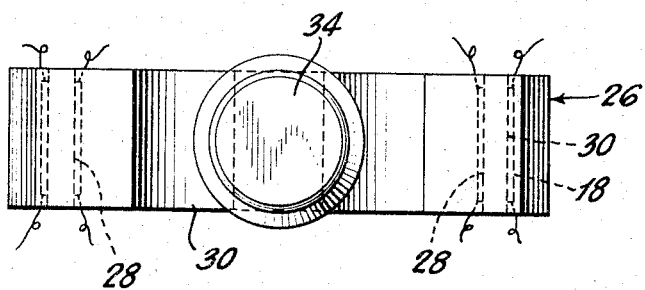
FIG. 6 is a plan view of the load sensitive element of FIG. 5.

The strain gauges used may be of the conventional types such as resistance wire secured to a support 22 of paper or plastic as shown in FIG. 5. When connected in series or series parallel in a circuit, such as a Wheatstone bridge circuit, the resistance of the wire as it is changed in cross sectional area by being stretched or compressed as the load is applied to the portion of the load sensitive element, is a measure of the load applied.

Figure 4:
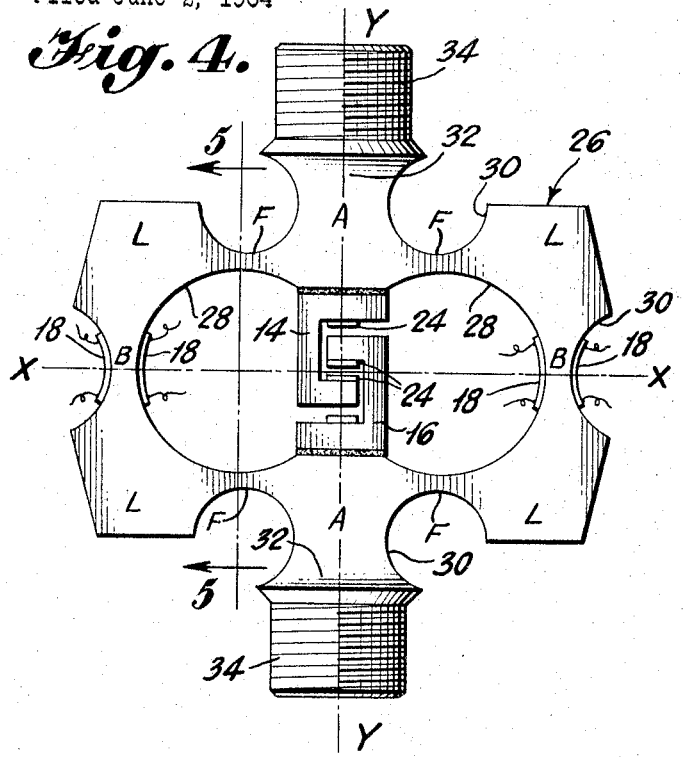
FIG. 4 is a view of a further embodiment of the invention.

In the embodiment of the invention shown in FIG. 4, the strain member is cut from a plate 26 and has a pair of circular openings 28 and cut out portions 30. The pair of circular openings 28 which are tangent or substantially tangent, afford a greater lever arm from A to B and maximum flexibility at the flexure F so the load will be transmitted from along the load axis through the flexure F and section L to give the greatest deflection of section B where the sides in tension and compression are substantially equal.

Unlike previous force rings, the construction provides a flexure F; otherwise under a compression load along the load axis $y$—$y$, the arch above the axis $x$—$x$ would be too rigid and tend to place section B substantially in compression until deflection of the arch would take place, in which case the outer side would be placed slightly in tension. Likewise, with a tension load, section B would be placed primarily in tension until the arch started to deflect at B. The provision of flexures or hinges between the application of the load along the load axis $y$—$y$ and sections B on the axis $x$—$x$ insures that sections B are placed in tension and compression by the load with substantially equal tension and compression loads.

Overload limit stops 14 and 16 are similar to those of FIG. 1 and are fixed to the inner surface of the ring on a flat portion created by cutting off the point between the two holes 28. Shims 24 are used to adjust the clearance between the legs of the C-shaped members.

Various modifications and changes can be made by those skilled in the art without departing from the spirit and scope of the dependent claim.

What is claimed is:

A load sensing device comprising a force ring formed from a plate having a central aperture formed therein and a scalloped outer periphery arranged symmetrically about a load applying axis, the scallops providing said force ring with portions of alternately thicker and thinner cross-sectional areas, low stress concentration occurring at the thicker cross-sectional areas and higher stress concentrations at the thinner cross-sectional areas, portions of thicker cross-sectional area and low stress concentration being arranged along the load applying axis, and portions of thinner cross-sectional area and higher stress concentration along an axis normal to said load applying axis and passing through the center of symmetry of said ring, additional portions of thinner cross-sectional area being located symmetrically on each side of said load axis adjacent said portions of low stress concentrations of high stress concentration which lie along said portions of high stress concentration which lie normal to said load axis by single portions of thicker cross-sectional area, said additional portions being arranged to bend under load to transmit a bending moment through said single portions of thicker cross-sectional area to said portions of high stress concentration which lies along said axis normal to said load axis, strain sensitive means mounted on said portions of high stress concentration which lie along said axis normal to said load applying axis to measure tension and compression strain as load is applied along said load axis, two interfitting C-shaped members secured to said force ring inside said aperture, one side of each C-shaped member being secured to said ring in said aperture along the load axis, the free ends of said C-shaped members interfitting each with the other to afford a stop in tension or compression when a load exceeds the design load of said ring, and shim means between portions of said C-shaped members along the load axis to regulate the deflection in tension or compression.

References Cited by the Examiner

UNITED STATES PATENTS

| 2,440,706 | 5/1948 | Tint | 73—141 X |
| 3,135,112 | 6/1964 | Farley | 73—141 |
| 3,222,628 | 12/1965 | Pien | 73—141 X |

FOREIGN PATENTS 587,096   4/1947   Great Britain.

OTHER REFERENCES

German application No. 1,067,241, pub. Oct. 15, 1959.

RICHARD C. QUEISSER, *Primary Examiner.*

C. A. RUEHL, *Assistant Examiner.*